United States Patent

Genta

[11] 3,890,094
[45] June 17, 1975

[54] POLYESTER TEXTILE DYED WITH YELLOW ESTER DYESTUFFS

[75] Inventor: Guido R. Genta, Snyder, N.Y.

[73] Assignee: American Aniline Products, Inc., Paterson, N.J.

[22] Filed: Oct. 25, 1972

[21] Appl. No.: 300,706

[52] U.S. Cl. .................. 8/179; 8/168; 260/37 P; 260/287 R; 264/78
[51] Int. Cl. .............................................. D06p 3/54
[58] Field of Search.............. 8/179, 168; 260/287 R

[56] References Cited
UNITED STATES PATENTS
3,661,856  5/1972  Lemper et al. ..................... 8/179
3,715,360  2/1973  Gaeng............................. 260/289 R Primary Examiner—Leland A. Sebastian
Attorney, Agent, or Firm—Armstrong, Nikaido & Wegner

[57] ABSTRACT

A new series of compounds is provided which comprise esters of a β-aryloxethanol and compounds of the 3'-hydroxyquinophthalone-5-carboxylic acid series. The compounds are made by condensing an appropriate acid in alcohol to form the desired ester. The resulting compounds have the formula:

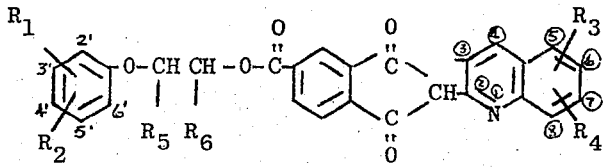

wherein
each of $R_1$ and $R_2$ is independently hydrogen, chlorine, bromine, lower alkyl or phenyl, or $R_1$ and $R_2$ taken together form a 2', 3'- or 3', 4'-benzo group;
$R_3$ is hydrogen, chlorine, bromine, lower alkyl, lower alkoxy or cyano;
$R_4$ is hydrogen, chlorine, bromine or methyl; or $R_3$ and $R_4$ taken together are a benzo group; and
one of the $R_5$ and $R_6$ is hydrogen and the other is hydrogen or methyl.

The compounds of the invention are suitable for the dyeing of synthetic fibers, such as polyestylene terephthalate, and also for the pigmentation of rigid plastic substrates.

5 Claims, No Drawings

POLYESTER TEXTILE DYED WITH YELLOW ESTER DYESTUFFS

BACKGROUND OF THE INVENTION

In the continuing search for dyes for polyester fabrics, a great variety of dyes have been proposed, although with the increasing performance requirements demanded of the dyes because of the use of new processing treatments, such as the Koratron process and other heat treatments, new dyes have been needed to meet these requirements. In the prior art various esters of the 3'-hydroxyquinophthalone-5-carboxylic acid series, such as the dyes principally proposed for cellulose acetate fibers by Richter, U.S. Pat. No. 3,023,213, have been suggested.

I have now discovered a new class of dyes which, when used to dye polyester textile material provide coloration with excellent fastness properties and excellent depth of shade. The compounds of my invention are also suitable for the coloration of rigid plastic substrates.

SUMMARY OF THE INVENTION

According to the invention there are provided ester dyestuffs of the formula

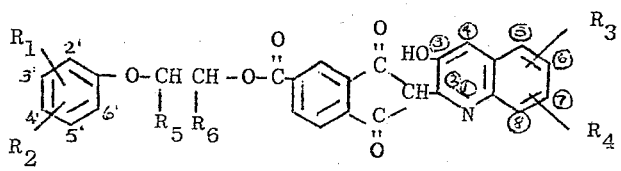

(I)

wherein

| | |
|---|---|
| each of $R_1$ and $R_2$ is | independently hydrogen, chlorine, bromine, lower alkyl or phenyl, or $R_1$ and $R_2$ taken together form a 2',3'- or 3',4'-benzo group; |
| $R_3$ is | hydrogen, chlorine, bromine, lower alkyl lower alkoxy or cyano; |
| $R_4$ is | hydrogen, chlorine, bromine or methyl; or $R_3$ and $R_4$ taken together are a benzo group; and |
| one of $R_5$ and $R_6$ is | hydrogen and the other is hydrogen or methyl. |

According to a preferred embodiment of the invention there are provided ester dyestuffs (I) which have the formula:

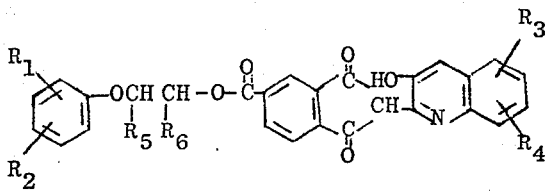

(IA)

wherein

| | |
|---|---|
| each of $R_1$ and $R_2$ is | independently hydrogen, chlorine, bromine, lower alkyl or phenyl; |
| $R_3$ is | hydrogen, chlorine, bromine, lower alkyl, lower alkoxy or cyano; |
| $R_4$ is | hydrogen, chlorine, bromine or methyl; and |
| one of $R_5$ and $R_6$ is | hydrogen and the other is hydrogen or methyl. |

According to a further preferred embodiment of the invention, there are provided ester dyestuffs (I) of the formula:

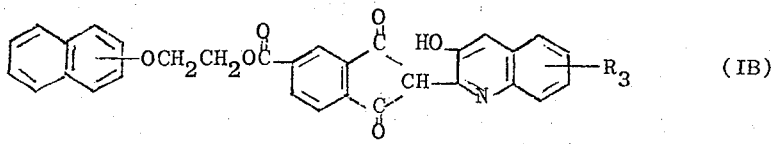

(IB)

wherein

| | |
|---|---|
| $R_3$ is | hydrogen, chlorine, bromine, lower alkyl, lower alkoxy or cyano. |

According to a further embodiment of the invention, there are provided dyeings on aromatic polyester textile material, particularly polyethylene terephthalate, with the ester dyestuffs (I).

According to a still further aspect of the invention, there are provided rigid plastic substrates which have been colored with the ester dyestuffs (I) of the invention.

As defined herein, lower alkyl refers to alkyl groups of up to about four carbon atoms, such as methyl, ethyl, propyl, and butyl. As a preferred lower alkyl group may be mentioned the methyl group. As lower alkoxy may be mentioned the alkoxy groups having up to about four carbon atoms, notably methoxy, ethoxy, propoxy and butoxy. A preferred lower alkoxy group is the methoxy group. As the benzo group represented by $R_1$ and $R_2$, when $R_1$ and $R_2$ form the 2', 3'-benzo group, the corresponding aryloxy group is an α-naphthyloxy group. Similarly, when the perameters $R_1$ and $R_2$ refer to a 3', 4'-benzo group, the group is part of an α-naphthyloxy group. With respect to the groups $R_3$ and $R_4$ as a benzo group, this refers to adjacent positions, i.e., the 5,6-, the 6,7- and the 7,8-benzo group.

DETAILED DESCRIPTION OF THE INVENTION

The ester dyestuffs (I) are produced by the reaction of trimellitic anhydride together with an appropriate amount of a 2-methyl-3-hydroxy-4-carboxyquinoline of the formula:

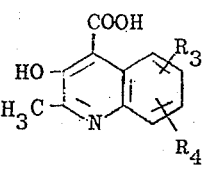

(II)

wherein $R_3$ and $R_4$ are as defined above, with a β-aryloxyalkanol of the formula:

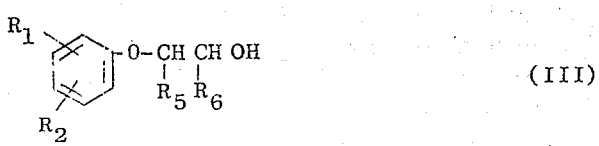
(III)

wherein $R_1$, $R_2$, $R_5$ and $R_6$ are as defined above.

The reaction is carried out in the presence of a high-boiling organic solvent, preferably ortho-dichlorobenzene, and optionally pyridine. Although the presence of pyridine is not necessary to cause the reaction, it has been discovered that the use of pyridine in the reaction improves the yield and quality of the dyestuffs which are obtained. In place of pyridine, para-toluenesulfonic acid and methanesulfonic acid may also be used.

The reaction takes place at elevated temperatures, preferably in the range of 165°–190° C. To achieve completion, the reaction is conducted for an extended period of time, 12–20 hours being generally suitable.

After the reaction is complete the mass is cooled and the solid product is separated and recovered, conveniently by filtration. The product thus obtained is washed and dried by conventional means.

To prepare the product for application to the polyester substrates noted hereabove, it must be suitably dispersed. This may be done by any of several well-known methods: milling as in a ball-mill with dispersing agents such as lignin sulfonic acid materials, for instance. The resultant aqueous dispersion can be dried, as in a spray-dryer, or preserved and used as a paste. Standardization to any desired lower strength can be done with inert colorless diluents such as inorganic slats for powders, or water for pastes. Other materials such as preservatives, foam-control agents, and melting agents may be added as desired.

Disperse pastes are made by wet milling the dye in conventional equipment in the presence of a dispersing agent, preferably sodium lignin sulfonate or sodium alkylnaphthalene sulfonate. Various other commercially available dispersing agents, such as sodium salts of carboxylated polyelectrolytes and the naphthalene sulfonates; e.g., the condensation products of sulfonated naphthalene and formaldehyde, such as sodium dinaphthylmethane disulfonate, are conveniently used. The oil disperse paste may be cut or standardized to a standard strength with water. The final color content of the finished paste averages from 10–40 percent by weight (pure color) active dye base.

Disperse powders are prepared by wet milling color in the presence of a dispersant, such as those mentioned hereabove, in equipment such as a ball mill, Werner-Pfleiderer mill or attritor. The dispersed material is oven or spray dried and micropulverized if necessary to provide the dispersed powder. The color is cut or standardized to a standard strength in a blender with a diluent, such as sodium sulfate or dextrin. A wetting agent, such as sodium cetyl sulfate or an alkylphenoxy polyethanol may be added to aid in wetting out the product when it is placed in the dye bath. Disperse powders are usually cut or standardized to 25–60 percent by weight color content (pure color).

The dye, when added to water with or without auxiliary agents, forms a near colloidal aqueous dispersion from which the aromatic polyester fiber or textile material is dyed in the conventional manner at 40°–100° C (104°–212° F) to give a colored fiber containing about 0.01–2 percent by weight dye (100% color basis).

Alternatively, dyeing may be accomplished without a carrier at temperatures of 100°–150° C under pressure. Also, the dye may be applied in patterns by conventional printing methods, if desired.

The dye can also be applied to the aromatic polyester fiber by thermofixation methods, such as the "Thermosol" process. This process, which involves padding the cloth with the diluted dye dispersion followed by drying and heating with dried hot air or heated contact rolls, is conveniently used for dyeing polyester fibers and blends containing these fibers. Fixation temperatures of 180°–220° C (356°–428° F) are used for 30 to 90 seconds. If the fabric contains cotton or viscose rayon, apart from synthetic fibers, there is little danger of damaging cellulosic portions, but if wool is present, the temperature must be kept within 180°–200° C and the time must be reduced to 30 seconds.

In order to evaluate the effectiveness of a particular dye for a given type of fiber, the dyed fiber is examined for substantivity of the color, light fastness of the color, and resistance of the color to sublimation. Specific tests for the evaluation of these important properties are described in the examples that follow.

The compounds of the invention may be used for the coloration of rigid plastic substrates. The rigid plastic substrates contemplated within the scope of the invention are those plastic materials capable of being pigmented with the compounds of the invention, and will be referred to herein as "rigid plastic substrates." The rigid plastic substrates of the invention include those materials capable of being formed into a shaped article, including semi-rigid materials which may be deformed by application of pressure.

As rigid plastic substrates of the invention may be mentioned terpolymers, including acrylonitrile-styrene-butadiene, often known as ABS; acrylics, including methacrylics; polystyrene, both foamed and rubber modified polysulfones; cellulosic derivatives, particularly esters such as cellulose acetate, propionate and butyrate; polyamides such as nylon; epoxy and phenolic resins; polycarbonates; and polyesters. It is understood that the rigid plastic substrates include those materials capable of being pigmented with the compounds of the invention, and therefore copolymers of the above classes of compounds, such as styrene-butadiene, are also within the scope of the invention.

Specific examples of thermoplastic resins include polyvinyl chloride, polyvinyl acetate, vinyl chloride/acetate copolymers, polyvinyl alcohol, polyvinyl acetal, ethylene/vinyl acetate, ethylene/vinyl propionate, ethylene/vinyl isobutyrate, ethylene/vinyl alcohol, ethylene/methyl acrylate, ethylene/ethyl acrylate ethylene/ethyl methacrylate, ethylene/allyl alcohol, ethylene/allyl acetate, ethylene/allyl acetone, ethylene/allyl benzene, ethylene/allyl ether, ethylene/acrolein, polyhexamethylene adipamide, polyhexamethylene sebacamide, polycaprolactam, polymethyl methacrylate, polyacrylonitrile, polymethyl acrylate, polyethyl methacrylate and styrene/methyl methacrylate.

As preferred rigid plastic substrates of the invention may be mentioned the polyacrylates, polystyrene and polycarbonates.

The rigid plastic substrates are colored with the compounds of the invention through pigmentation processes. The compounds are admixed with the plastic using sets of mixing rollers, mixing or milling apparatus. After the compounds and the plastic have been thoroughly mixed, the resultant colored mixture is shaped into the desired final form through procedures well known to those skilled in the art, such as pouring, calendering, extrusion, spreading, or injection molding. Where the desired product is a semi-rigid material, plasticizers may advantageously be added prior to shaping into the desired final form. As plasticizers suitable for this purpose may be mentioned esters of phthalic acid. Although the plasticizer may be incorporated after the mixing of the compound of the invention with the rigid plastic substrate, it also can be incorporated into the rigid plastic material prior to mixing the pigment with the rigid plastic material. In order to vary the strength of the finished product or vary the color, it is also possible to add additional pigments or fillers in an amount sufficient to obtain the desired effect.

The amount of the compound of the invention which is used to color the rigid plastic substrate may vary widely depending upon the degree of color wished to be imparted to the final product, and depending upon whether the compound of the invention is the sole colorant or whether it is used in admixture with other plastic colorants. When the compound of the invention is used in admixture with other colorants, obviously a very minute quantity may be used to produce a complementary effect. Generally, the amount of colorant comprises less than 15%, preferably less than about 8%, by weight in relation to the rigid plastic substrate. An amount of colorant compound which has proved particularly valuable is about 0.0001% to about 1%.

The following examples illustrate the invention:

EXAMPLE 1

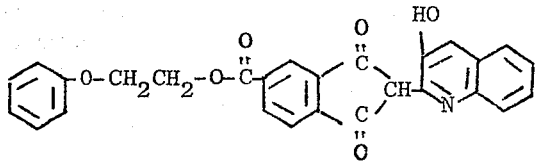

Preparation:

| | |
|---|---|
| 5 parts | o-dichlorobenzene, |
| 1.1 parts | trimellitic anhydride, |
| 1.1 parts | 2-methyl-3-hydroxy-4-carboxyquinoline, |
| 1.1 parts | 2-phenoxyethanol, and |
| .3 part | pyridine were stirred together and heated at 185° to 190°C for 16 hours. The mass was then allowed to stir and cool to 100°C whereupon 5 parts by volume of denatured alcohol were slowly added. After further cooling to 30°C, the precipitate was collected by suction filtration and washed with denatured alcohol and water and dried. 1.4 parts of the dyestuff of the above formula were obtained. |

Dispersion:

A cake thus obtained was ground in a ball mill to a 15% paste, using 20% by weight of "Marasperse N-22" (a commercially available sodium lignin sulfonate) based on the final product weight to yield 1,000 grams of disperse paste having a 15% color content.

EXAMPLE 2

An aqueous dye bath containing 10% Marcron L (a commercially available phenolic dye carrier) and 1% monosodium phosphate as a buffering agent was prepared. Type 54 "Dacron" polyester fabric was treated in a bath at 120° C for 10 minutes, the fabric-to-water dye bath ratio being 1:40. The disperse dye made as described in Example 1 was added in an amount sufficient to provide a bath containing 0.4% dye based on the weight of polyester fibers. Dyeing was continued for 1 hour at 205° F and the fabric was removed from the bath, rinsed and dried. Sample dyeings were tested for sublimation according to standard AATCC Color Fastness to Dry Heat (sublimation) Test No. 117–1967T, page 123 of the 1970 Technical Manual of the American Association of Textile Chemists and Colorists. Dyed fabric was placed between a sandwich of undyed "Dacron" polyester fabric and heat was applied for 30 seconds. Sublimation tests were made at 350° F and 400° F on goods as described above. The dyeing was characterized by bright yellow hue of excellent tinctorial strength. Sublimation tests showed substantially no transfer of color, even at 400° F.

Similar excellent results were obtained when the dye was applied to the fabric by thermofixation methods and then tested for sublimation as described above.

The dyeings were also tested for light fastness by subjecting them to carbon arc fading in accordance with AATCC. Color Fastness to Light, Carbon Arc Lamp, Continuous Light Test No. 16A–1964, as detailed on p. 127, of the 1970 Technical Manual of the AATCC. The dyeings showed little or no break at 40 hours' exposure, indicating very good fastness to light.

EXAMPLE 3

Methyl methacrylate resin is colored with the compound of Example 1 as the colorant, in a ratio of 2 grams resin to 1 mg colorant. The resin is prepared by placing 1 lb of methyl methacrylate into a Thropp mill (a two-roller mill), which is then heated and run in order to melt and smash the resin to a molten mass. The compound of Example 1 is added and the entire mixture of resin and colorant is milled until the colorant is uniformly distributed in the mass as measured by eye. While still hot, 30 grams of the hot mass is cut off for use in the following procedure. The sample, containing 30 grams methyl methacrylate and 15 mg of the compound of Example 1 as colorant, may be conveniently molded in a Laboratory 40 Single Acting Watson-Stillman Laboratory Press (Farrell-Birmingham Co. 50-ton press). 30 grams of methyl methacrylate mixture containing 15 mg of the compound of Example 1 per pound of methyl methacrylate is placed in the cold mold, which is then closed with the Schrader Valve. The drain is opened and steam is applied to the mold. When steam comes through the drain pipe, the drain is closed. Up to 25.0 tons pressure is exerted on the chips until the mold is fully closed. This can conveniently be accomplished by observing the pressure gauge. When the gauge needle no longer decreases in pressure, the mold is then closed.

The mold is held closed at zero pressure by releasing the hydraulic pressure and maintaining the steam for 5 minutes, the mold pressure is increased to 10 tons and held for 10 minutes, the steam remaining on.

The mold pressure is increased to 15 tons and the steam shut off; the drain is opened and cooling water is added for 5 minutes. Thereafter the pressure is changed to zero and the mold is opened to extract the resultant yellow plastic chip.

EXAMPLE 4

When the 30 gram mixture of methyl methacrylate is replaced by 2 pounds polystyrene and 10.44 grams titanium dioxide and 227 mg. of the compound of Example 1 is added, the procedure of Example 3 being otherwise followed, a fast yellow coloration of the polystyrene is obtained.

EXAMPLE 5

The compound of Example 1 may also be used as a colorant for plastics made from polycarbonates. A pigmented plastic material of polycarbonates and the compound of Example 1 may be prepared according to the following procedure:

A specimen is prepared by dry mixing pelletized or powdered resin with finely divided colorant until uniform distribution is achieved of the colorant in the resin material. Plasticizer may also be added, if desired. The mixture is then extruded or injected molded under suitable conditions. 454 gms. Lexan 121-R (General Electric) pellets are placed in Bipel 1-ounce reciprocating screw injection molder. The pellets are tumbled for 5 minutes on the barrel tumbler. The resin is heated (front zone temperature of 550° F and rear zone temperature of 500° F) and chips are produced from the virgin resin until chips of good quality are obtained. When the desired quality of chips are obtained with the clear resin, a fresh batch of Lexan 121-R, containing the compound of Example 1 in an amount needed to produce a pigmented plastic material, is fed into the injection molder to produce pigmented chips having excellent fastness characteristics.

EXAMPLE 6

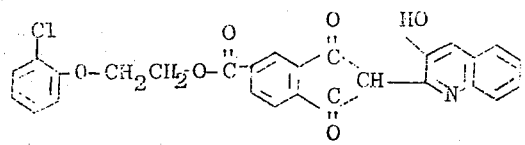

Substitution of an equivalent amount of 2-(2'-chlorophenoxy) ethanol for the 2-phenoxyethanol in the procedure of Example 1 yields a dye of the above indicated formula. When dyed on polyester according to the procedure of Example 2, there is obtained a bright reddish-yellow dyeing on polyethylene terephthalate of properties similar to that of the dyeing of Example 2.

EXAMPLE 7

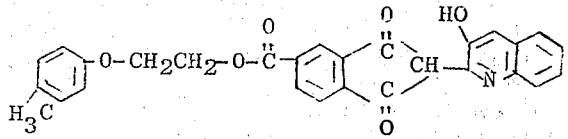

Substitution of an equivalent amount of 2-(p-tolyloxy) ethanol for the 2-phenoxyethanol in the procedure of Example 1 yields a reddish yellow dye of the above formula. The dyeings on polyester are a bright yellow of good tinctorial strength and fastness properties. Sublimation is especially good.

EXAMPLES 8–23

By following the procedure of Example 1 with the appropriate substitution of intermediates, the dyes of Table I are provided. The substituents listed in the table correspond to the formula below. The dyes, when appropriately dispersed, are used to dye polyester textile material according to the procedure of Example 2 and rigid plastics according to the procedures of Examples 3–5.

TABLE I

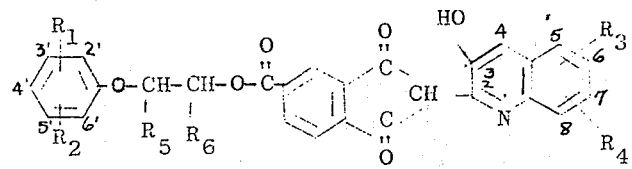

| Ex. | $R_1$ | $R_2$ | $R_3$ | $R_4$ | $R_5$ | $R_6$ | Shade |
|---|---|---|---|---|---|---|---|
| 8 | 4'-⌬ | H | H | H | H | H | Reddish Yellow |
| 9 | 2'-⌬ | H | H | H | H | H | Reddish Yellow |
| 10 | 4'-Br | H | H | H | $CH_3$ | H | Reddish Yellow |
| 11 | H | H | H | H | $CH_3$ | H | Reddish Yellow |
| 12 | 4'-$CH_3$ | H | H | H | H | $CH_3$ | Reddish Yellow |

Table I — Continued

| | | | | | | | |
|---|---|---|---|---|---|---|---|
| 13 | 4'-$CH_3$ | 2'-$CH_3$ | H | H | H | H | Reddish Yellow |
| 14 | H | H | 6-Br | H | H | H | Reddish Yellow |
| 15 | 2'-Cl | 4'-Cl | H | H | H | H | Reddish Yellow |
| 16 | H | H | 6-$OCH_3$ | H | H | H | Reddish Yellow |
| 17 | 3'-Cl | H | 6-Cl | H | H | H | Reddish Yellow |
| 18 | H | H | 6-CN | H | H | H | Reddish Yellow |
| 19 | H | H | 4-Br | H | H | H | Reddish Yellow |
| 20 | 3'-$CH_3$ | H | 6-Cl | 8-Cl | H | H | Reddish Yellow |
| 21 | H | H | 4-Cl | H | H | H | Reddish Yellow |
| 22 | H | H | 6-Cl | 8-Cl | H | H | Reddish Yellow |
| 23 | 4'-Cl | H | H | H | H | H | Reddish Yellow |

EXAMPLES 24–32

By following the procedure of Example 1 with the appropriate substitution of intermediates, the dyes of Table II are provided. The substituents listed in the table correspond to the formula below. The dyes, when appropriately dispersed, are used to dye polyester textile material according to the procedure of Example 2 and rigid plastics according to the procedures of Examples 3–5.

| Ex. | Position of Naphthyl | $R_3$ | $R_4$ | Shade |
|---|---|---|---|---|
| 24 | 1" α | H | H | Reddish Yellow |
| 25 | 2" β | H | H | Reddish Yellow |
| 26 | 1" α | 4—Br | H | Reddish Yellow |
| 27 | 2" β | 4—Br | H | Reddish Yellow |
| 28 | 1" α | 6—Br | H | Reddish Yellow |
| 29 | 1" α | 6—CN | H | Reddish Yellow |
| 30 | 1" α | 6—Cl | H | Reddish Yellow |
| 31 | 1" α | 6—$OCH_3$ | H | Reddish Yellow |
| 32 | 2" β | 6—$OCH_3$ | H | Reddish Yellow |

TABLE II

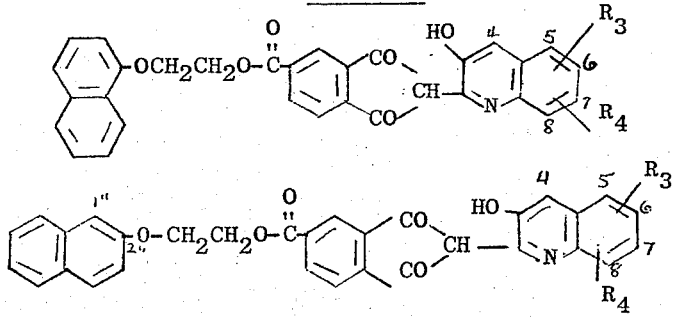

What is claimed is:
1. A polyester textile dyed with a compound of the formula:

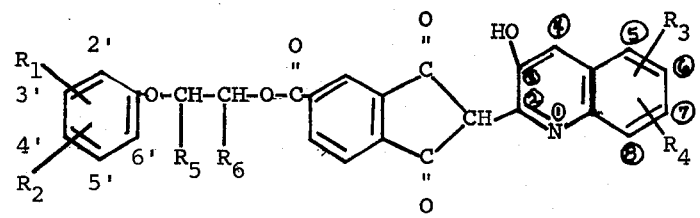

wherein
- each of $R_1$ and $R_2$ is independently hydrogen, chlorine, bromine, lower alkyl or phenyl, or $R_1$ and $R_2$ taken together form a 2',3'- or 3',4'-benzo group;
- $R_3$ is hydrogen, chlorine, bromine, lower alkyl, lower alkoxy or cyano;
- $R_4$ is hydrogen, chlorine, bromine or methyl; or $R_3$ and $R_4$ taken together are a benzo group; and
- one of $R_5$ and $R_6$ is hydrogen and the other is hydrogen or methyl.

2. A polyester textile dyed with a compound of the formula:

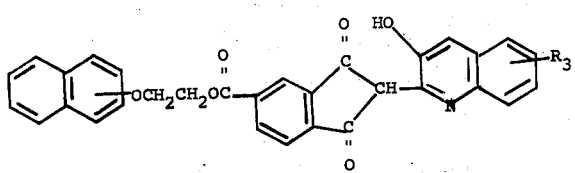

wherein
- each of $R_1$ and $R_2$ is independently hydrogen, chlorine, bromine, lower alkyl or phenyl;
- $R_3$ is hydrogen, chlorine, bromine, lower alkyl, lower alkoxy or cyano;
- $R_4$ is hydrogen, chlorine, bromine or methyl; and
- one of $R_5$ and $R_6$ is hydrogen and the other is hydrogen or methyl.

3. Polyester textile of claim 1 wherein said compound is:

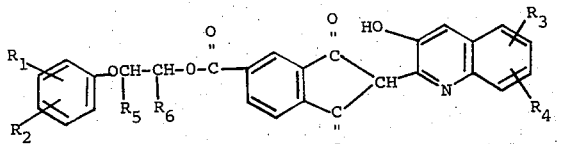

wherein $R_3$ is hydrogen, chlorine, bromine, lower alkyl, lower alkoxy, or cyano.

4. Polyester textile of claim 1 wherein said compound is of the formula:

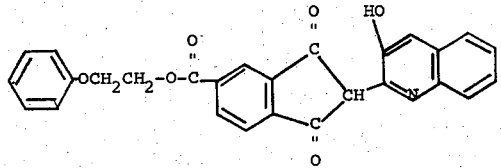

5. Polyester textile of claim 1 wherein said compound is of the formula:

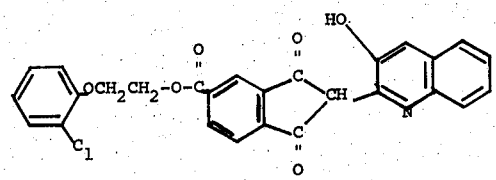

* * * * *